United States Patent [19]

Hayden et al.

[11] 4,059,732
[45] Nov. 22, 1977

[54] CENTRALIZED TELEPHONE ANSWERING APPARATUS WITH REMOTE ACCESSING

[75] Inventors: Robert W. Hayden, Clackamas; Glenn Clarridge, Portland, both of Oreg.

[73] Assignee: Ford Industries, Inc., Portland, Oreg.

[21] Appl. No.: 703,745

[22] Filed: July 9, 1976

[51] Int. Cl.² .......................................... H04M 3/42
[52] U.S. Cl. ................................. 179/18 B; 179/6 E; 179/18 FH
[58] Field of Search ............................ 179/18 B, 6 E

[56] References Cited
PUBLICATIONS

Glossary of Communications; Emerson C. Smith, p. 292.

Primary Examiner—William C. Cooper
Attorney, Agent, or Firm—Kolisch, Hartwell, Dickinson & Stuart

[57] ABSTRACT

A telephone system employing centrally located telephone answering devices, each assigned to a different subscriber's telephone line. Also centrally located, and intended to be shared, one at a time, by all of the answering devices, is a single electrical tone generator which is used for enabling selective addressing of the different answering devices by their respective subscribers, for the purpose of listening to recorded messages, changing outgoing messages, etc. The tone generator is connected to its own associated telephone line, and is placed in operation through a subscriber's call to the particular telephone number assigned to such line.

4 Claims, 2 Drawing Figures

CENTRALIZED TELEPHONE ANSWERING APPARATUS WITH REMOTE ACCESSING

BACKGROUND AND SUMMARY OF THE INVENTION

This invention pertains to a telephone system including centrally located telephone answering equipment, and more particularly to such a system in which a subscriber may access his assigned telephone answering device through calling a telephone number assigned to a tone generator, also centrally located, the operation of which establishes an operative connection between the device and the subscriber.

There are various telephone answering services now made available by telephone companies in which a plurality of telephone answering devices is located at the company's central office, which devices are leased or rented by various subscribers. In other words, instead of a subscriber having his own answering device located at the place of his office or home telephone, he rents the use of such a device which is under the maintenance and control of a telephone company.

One of the problems in the past has concerned the provision for the subscriber to gain access to his assigned answering device for the purpose of changing an outgoing message, listening to incoming messages, etc. One type of prior art system has made use of so-called pocket tone encoders, which are small battery-powered hand-held devices about the size of a package of cigarettes, with these devices including keys or pushbuttons for generating tone codes that are used to gain access to a remote answering device. These hand-held devices, however, are sometimes inconvenient to carry, or may be forgotten, and can be quite expensive. Another prior access system has involved the use, in a conventional tone-dial telephone system, of the two so-called "special" tone-dial buttons which are provided in the system and which carry no number or letter designations. While it is possible in certain areas to arrange with a telephone company to use these two buttons, an important drawback here is that the company may, at some time in the future, decide to realign priorities for the use of these buttons, which realignment would result in the loss of accessing service.

A general object of the present invention, therefore, is to provide a novel and very simple and inexpensive system solving these accessing problems in a practical and satisfactory manner.

According to a preferred embodiment of the invention, a telephone system is provided which employs centrally located telephone answering devices, each assigned to a different subscriber's telephone line in accordance with the subscriber's wish to have central telephone answering service. Also centrally located in the system, and intended to be shared by all of the answering devices in the system, or at least by a large number of such devices, is an audio electrical tone generator which is assigned its own telephone line having its own distinct calling number.

Further included in the proposed system, and associated with each answering device in the system, is an audio tone sensor and special switching mechanism. Under normal circumstances, with respect to a particular subscriber's telephone line, this switching mechanism establishes a closed connection between the line and the telephone company's central office switching equipment, and also produces a normally open connection between the line and the appropriate input to the answering device circuitry. The switching mechanism is under the control of the audio tone sensor.

What a subscriber does to gain access to his assigned answering device is to dial or otherwise call the telephone number assigned to the shared tone generator. On the call arriving at the tone generator, the same turns on, and by virtue of the direct connection existing between the subscriber's line and tone generator, the tone generated by the generator is transmitted to the subscriber's line and picked up by the sensor. The sensor responds to this condition by actuating the switching mechanism so as to break the connection between the line and the central office switching equipment, and to make a connection between the line and the circuitry in the answering device. A subscriber may then in any suitable fashion, for example, in accordance with certain dial or tone codes, operate the answering device in any one or more of its several functioning modes. When the subscriber hangs up his phone, the switching mechanism is returned to its initial condition so that the open and closed connections mentioned above are reestablished.

A special feature herein is that means is also provided whereby during a time that a subscriber has access to his device, should an outside caller try to reach him, a distinctive tone sounds over the subscriber's line, letting him know that he has an incoming call. To receive this call, if he so wishes, he need simply hang up his phone and allow it to ring in the usual fashion. When he picks up the phone in answer to the ring he is properly connected to the calling party.

These and other objects and advantages which are attained by the invention will become more fully apparent as the description which now follows is read in conjunction with the accompanying drawings.

DETAILED DESCRIPTION OF THE INVENTION

Figure 1:
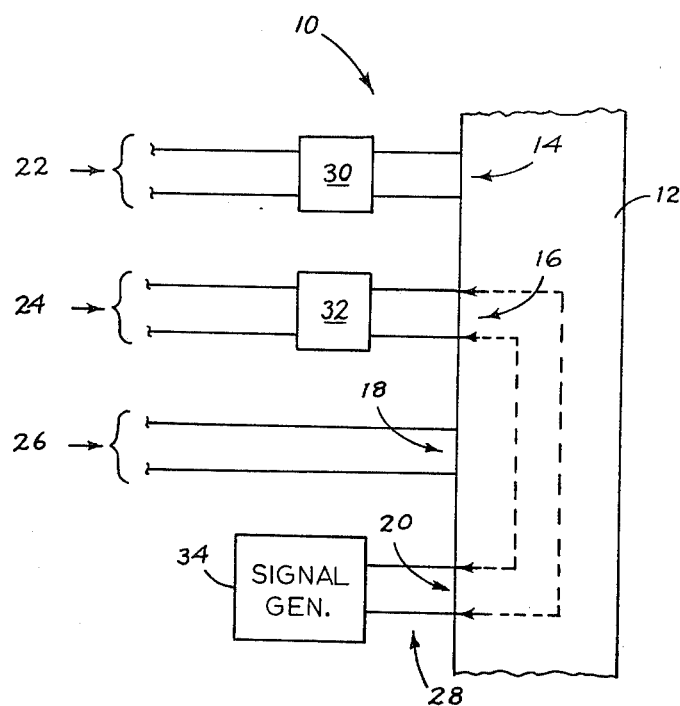
FIG. 1 is a simplified fragmentary view of a telephone system employing apparatus contructed in accordance with the present invention.

Turning now the drawings, and referring first to FIG. 1, indicated generally at 10 is a portion of a telephone system which is conventional in construction except insofar as it incorporates apparatus contructed in accordance with the present invention. Included in system 10 is conventional central office switching equipment, or circuitry, 12 which includes the usual plurality of ports, such as the four shown at 14, 16, 18, 20 which may be connected to the usual two-conductor telephone lines such as those shown for these ports at 22, 24, 26, 28, respectively. Provided within equipment 12 is the usual means that enable the selective intercoupling of different pairs of stations, so as to interconnect calling and called telephone lines. For example, shown within the fragmentary block which represents equipment 12 are two-arrow-ended dashed lines which represent a coupling existing between ports 16, 20, and hence between lines 24, 28. In other words, in a manner which will shortly be described, a call has been placed in system 10 which has resulted in the establishment of this coupled connection.

In the particular system shown, the subscribers of lines 22, 24 have requested that the telephone company provide centrally located telephone answering service. Hence, represented in block form at 30, 32 in FIG. 1 are two answering devices, and necessarily associated circuitry and means, for lines 22, 24, respectively. The subscriber to line 26 has not requested such service, and hence no such apparatus is provided with respect to line 26. In other words, line 26 is connected directly to station 18, whereas lines 22, 24 are intercepted by blocks 30, 32 on their routes, so-to-speak, to ports 14, 16, respectively.

Connected to telephone line 28, in accordance with an important feature of the present invention, is a conventional electrical audio tone generator 34, also referred to herein as an electrical signal generator. Inasmuch as the construction of this device is conventional and may take a variety of known forms, it is unnecessary herein to discuss details of construction. Suffice it to say that generator 34 is so constructed that on a telephone call being received at line 28 through equipment 12, the signal generator turns on for a predetermined short time interval, such as about five seconds, and supplies an electrical signal to the line at a frequency of about 1800 Hz.

It might be mentioned at this point that while system 10 has been illustrated with only four telephone lines being shown, and only two of these lines employing answering service, it is appreciated that the system may, and in most circumstances will, include a far greater number of interconnectable telephone lines, many more of which may use answering service. As will become apparent, an important contribution of the invention is that but a single signal generator is required for accessing a much greater number of answering devices. There is certainly no fixed maximum number of answering devices which can be accommodated by a single generator device, but a very practical and workable number has been found to be about 40 to 50.

Figure 2:
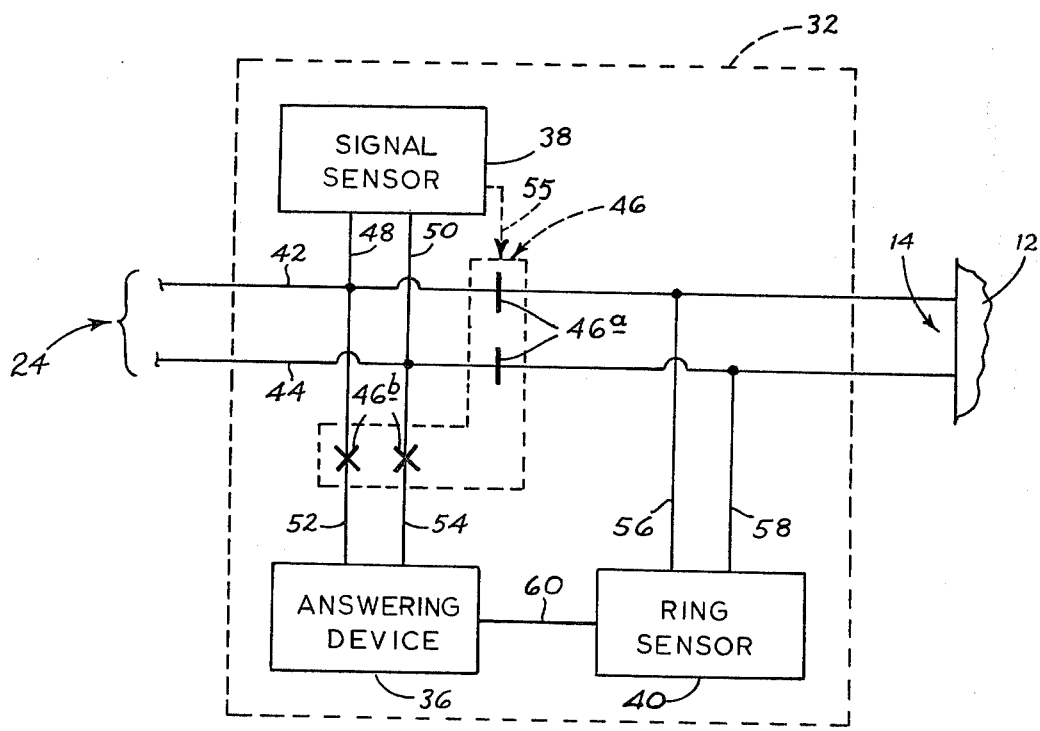
FIG. 2 is a somewhat more detailed schematic and block drawing illustrating an answering device, a sensor and switching mechanism acssociated, according to the invention, with a particular subscriber's telephone line.

Turning now to FIG. 2 which illustrates details of the contents of block 32, contained therein are a conventional answering device 36, a signal sensor 38 and a ring sensor 40.

In FIG. 2, telephone line 24 is seen to include two conductors 42, 44. These two conductors extend to the right in FIG. 2 toward station 14 through the normally closed contacts 14a of a conventional relay-type switch, or switching means, generally outlined in dashed lines at 46. The input to signal sensor 38 is connected to conductors 42, 44 through conductors 48, 50, respectively. The input to answering device 36 is connected to conductors 42, 44 through conductors 52, 54, respectively, which conductors extend through the normally open contacts 46b in switch 46. It will be noticed that the connections just mentioned for the inputs to sensor 38 and device 36 are made on the far side of contacts 46a from station 14. The reason for this become apparent shortly. Shown at 55 in dashed lines is a conventional operative connection between sensor 38 and switch 46, the operative relationship between which will be described shortly. Such a connection may be made in a variety of well known conventional ways, none of which forms any part in this invention.

The input to ring sensor 40 is connected to conductors 42, 44, on the right side of contacts 46a in FIG. 2, through conductors 56 and 58, respectively. A conductor 60 interconnects sensor 40 and device 36.

What has just been described as the contents of block 32 are also contained within block 30.

Explaining now the operation of the described apparatus, it will be seen that under normal circumstances, which are depicted in FIG. 2, contacts 46a are closed and contacts 46b are open. Hence, there is normally a direct connection between the telephone line 24 and port 14 in equipment 12. Thus, the subscriber may use his line in the usual fashion to call other telephones.

Should the subscriber desire to gain access to his assigned answering device 36, for the purpose of listening to any received messages and/or changing the outgoing announcements, and/or to perform any other function, he simply dials or otherwise calls the telephone number assigned to line 28 which is connected to generator 34. When his call has been placed, the connection represented by the dashed lines in FIG. 1 will be conventionally made between lines 24, 28, and as previously indicated, generator 34 will turn on and generate its signal. Since, as can be seen, a direct connection exists between lines 28, 24, this signal is transmitted to line 24 where it is picked up and responded to by sensor 38. Sensor 38 responds by actuating switch 46 to open contacts 46a and close contacts 46b.

With such operation, it will be seen that a connection between line 24 and equipment 12 is broken, and a connection is established to the input of the answering device. Further, closure of contacts 46b energizes a conventional holding circuit which holds switch 46 in this switched condition until the subscriber hangs up his telephone.

The subscriber may then, either by using dial pulses or dial tones, or in some other manner of transmitting over line 24, control the various functions of device 36 in an entirely conventional manner. When he has completed whatever tasks he intends, he may simply hang up his telephone, whereupon switch 46 will return to its initial condition with contacts 46a closed and contacts 46b open.

During the time that the subscriber has access to device 36, should a call from some third party try to reach line 24, it will be obvious that this call cannot be completed so long as contacts 46a are open. Nevertheless, placement of such a call produces ringing in the line conductors on the right side of contacts 46a in FIG. 2, which ringing is picked up by ring sensor 40. The ring sensor under these circumtances transmits a signal via conductor 60 which, through an appropriate tone generation device in answering device 36, sends a short tone through conductors 52, 54 into line 24 to indicate to the subscriber that someone is trying to call him. If he chooses to take the call, all that he need do is simply hang up his phone whereupon contacts 46a will reclose to allow ringing at the subscriber's telephone.

It is believed to be clear from the above structural and operational description how relatively simple the proposed accessing apparatus of the invention is. No special equipment is required in the hands of a subscriber, and it is not necessary to use the so-called "special" tone-dial buttons in a tone-dial type telephone system. As soon as a particular subscriber has gained access to his answering device, and with opening of contacts like contacts 46a, the connection through the telephone system to the shared signal generator is broken, whereupon another subscriber may then call the telephone number assigned to the generator to gain access to his answering device. Thus, a single accessing signal generator is easily capable of handling a large number of telephone answering devices.

While a preferred embodiment of the invention has been described, it is appreciated that variations and modifications may be made without departing from the spirit of the invention.

What is claimed is:

1. Apparatus in a telephone system for accessing, from a subscriber's telephone line in the system, a remote associated answering device located adjacent central switching circuitry in the system, which circuitry includes a plurality of ports each operatively connectable to a different telephone line and means for producing selected couplings through said circuitry between different pairs of said ports, said apparatus, in operative condition with respect to such equipment, comprising an electrical signal generator operatively connected to one of said ports and operable, on a call being recevied at said one port through said switching circuitry, to apply an electrical signal to said one port, and through said one port and said switching circuitry to the particular port then coupled through said switching circuitry with said one port, electrical switching means operatively interposed between said subscriber's line, said answering device and another one of said ports, normally producing a closed connection between said other port and said line, and an open connection between said other port and said answering device, and a sensor operatively connected both to said line and to said switching means responsive to the occurrence on said line of signal received through said other port and said switching circuitry from said signal generator, to actuate said switching means, thus to open said normally closed connection and to close said normally open connection.

2. The apparatus of claim 1 which further includes means operable with access had to said answering device for transmitting to said subscriber's line an indication of any incoming call coupled through said switching circuitry to said other port.

3. Apparatus in a telephone system for accessing at different times, from a plurality of subscriber's telephone lines in the system, different line-associated answering devices located adjacent central switching circuitry in the system, which circuitry includes a plurality of ports each operatively connectable to a different telephone line in the system and means for producing selective couplings through said circuitry between different pairs of said ports, said apparatus, in operative condition with respect to such equipment, comprising a shared electrical signal generator for use in conjunction, one at a time, with all of said answering devices, said generator being operatively connected to one of said ports other than a port associated with a subscriber's telephone line, and beng operable, on a call being received at said one port through said switching circuitry, to apply an electrical signal to said one port, and through said one port and said switching circuitry to the particular port then coupled through said switching circuitry with said one port, and for each answering device, electrical switching means operatively interposed between the associated subscriber's telephone line, said answering device, and another one of said ports, normally producing a closed connection between said other port and said associated telephone line, and an open connection between said other port and said answering device, and a sensor operatively connected both to said associated line and to said switching means, responsive to the occurrence on said associated line of a signal received through said other port and said switching circuitry from said signal generator, to actuate said switching means, thus to open said normally closed connection and to close said normally open connection.

4. The apparatus of claim 3 which further includes, for each answering device, means operable with access had to an answering device for transmitting to the associated subscriber's line an indication of any incoming call coupled through said switching circuitry to the port provided for said line.

* * * * *

UNITED STATES PATENT AND TRADEMARK OFFICE
CERTIFICATE OF CORRECTION

PATENT NO. : 4,059,732
DATED : November 22, 1977
INVENTOR(S) : Robert W. Hayden and Glenn Clarridge It is certified that error appears in the above—identified patent and that said Letters Patent are hereby corrected as shown below:

In column 2, line 49, after "now" insert --to--;

In column 2, line 61, delete "stations" and insert therefor --ports--;

In column 3, line 12, delete "station" and insert therefor --port--;

In column 3, line 48, delete "station" and insert therefor --port--;

In column 3, line 59, after "this" insert --will--;

In column 4, line 49, delete "circumtances" and insert therefor --circumstances--;

In column 5, line 34, after "of" insert --a--.

Signed and Sealed this

Sixth Day of February 1979

[SEAL]

Attest:

RUTH C. MASON
Attesting Officer

DONALD W. BANNER
Commissioner of Patents and Trademarks